(12) United States Patent
Ranganathan et al.

(10) Patent No.: US 7,595,796 B2
(45) Date of Patent: Sep. 29, 2009

(54) OPTIMIZING LIFETIME OF A DISPLAY

(75) Inventors: Parthasarathy Ranganathan, Palo Alto, CA (US); William Hamburgen, Palo Alto, CA (US); Robert N. Mayo, Mountain View, CA (US); Ken Nicholas, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 888 days.

(21) Appl. No.: 10/830,216

(22) Filed: Apr. 23, 2004

(65) Prior Publication Data

US 2005/0237319 A1 Oct. 27, 2005

(51) Int. Cl.
*G09G 5/00* (2006.01)
(52) U.S. Cl. ............................ 345/214; 345/77; 345/84; 345/204; 345/694; 345/904
(58) Field of Classification Search ................ 345/83, 345/87–100, 204, 44, 46, 76, 77, 80, 82, 345/84, 904, 214; 313/503, 504, 507; 315/169.1, 315/169.3
See application file for complete search history.

(56) References Cited

U.S. PATENT DOCUMENTS

| | | | | |
|---|---|---|---|---|
| 5,608,845 | A * | 3/1997 | Ohtsuka et al. | 706/45 |
| 6,414,661 | B1 * | 7/2002 | Shen et al. | 345/82 |
| 6,456,016 | B1 | 9/2002 | Sundahl et al. | |
| 6,552,735 | B1 | 4/2003 | Dehmlow | |
| 7,176,861 | B2 * | 2/2007 | Dedene et al. | 345/83 |
| 2002/0011777 | A1 * | 1/2002 | Konishi et al. | 313/495 |
| 2003/0135288 | A1 | 7/2003 | Ranganathan et al. | |
| 2003/0156074 | A1 | 8/2003 | Ranganathan et al. | |
| 2004/0178974 | A1 * | 9/2004 | Miller et al. | 345/82 |

OTHER PUBLICATIONS

EP 1 408 722 A1; Miller, Michael E.; Pub. Date Apr. 14, 2004; Priority Date Oct. 11, 2002;Assignee Eastman Kodak Co Title: Method of designing an OLED display with optimized lifetime.*
Eastman Kodak Company, Driver circuit for and method of driving an emissive video matrix display, May 19, 2003, EP1367559, Rochester, NY.
Bloom, L. et al., "Investigating the Relationship Between Battery Life and User Acceptance of Dynamic, Energy-Aware Interfaces on Handhelds", Hewlett Packard Technical Report, Downloaded from the Internet on Apr. 22, 2004.
Choi, I. et al., "Low-Power Color TFT LCD Display for Hand-Held Embedded Systems", Aug. 2002.
Draffan, E.A. et al., "Colour and Contrast Accessibility Issues: For the Design of E-Learning Materials", May 2003.
eTForecasts, "Worldwide PDA & Smartphone Forecase 1998-2008", Jun. 2003.

(Continued)

*Primary Examiner*—Bipin Shalwala
*Assistant Examiner*—Vince E Kovalick (57) ABSTRACT

A lifetime of a display is optimized by determining whether to control at least a portion of a display based on a lifetime metric. A plurality of display control options is identified in response to determining to control the portion of the display, and one of the display control options is selected.

29 Claims, 6 Drawing Sheets

OTHER PUBLICATIONS

Flinn, J. et al., "Energy-Aware Adaptation for Mobile Application", 1999.

Geelhoed, E. et al., "Energy-Aware User Interfaces and Energy-Adaptive Displays: Improving Battery Lifetimes in Mobile Devices", Proceedings of HP TechCon, Jun. 2004; Downloaded from the Internet on Apr. 22, 2004.

Harter, T. et al., "Energy-Aware User Interfaces: An Evaluation of User Acceptance", Proceedings of the Annual Conference on Human Factors in Computing Systems, 2004; Downloaded from the Internet on Apr. 22, 2004.

Harter, T. et al., "The Potential for Energy-Aware User Interfaces on Handheld Devices", Nov. 2003.

Iyer, S. et al., "Energy-Aware Display System Designs for Future Mobile Environments", ACM Press, 2003.

Kamijoh, N. et al., "Energy Trade-Offs in the IBM Wristwatch Computer", IBM Research Division, Oct. 2001. Abstract.

Pering, T. et al., "The Simulation and Evaluation of Dynamic Voltage Scaling Algorithms", ACM ISBN Aug. 2000.

Richardson, T. et al., "Virtual Network Computing", IEEE Internet Computing, Jan./Feb. 1998.

Udani, S. et al., "The Power Broker: Intelligent Power Management for Mobile Computer", Dept of Computer Information Science, University of Pennsylvania, 1996.

Viredaz, M. et al., "Energy Management on Hanheld Devices", ACM Press, 2003.

Viredaz, M. et al., "Power Evaluation of a Handheld Computer", IEEE Micro, 2003.

Xiong, S. et al., "A Simple and Flexible Driver for OLED", ASID, 1999. Abstract.

Office Action issued in related Chinese Patent Application No. 20050020897.3 on Mar. 7, 2008.

\* cited by examiner

OPTIMIZING LIFETIME OF A DISPLAY

TECHNICAL FIELD

This invention relates generally to displays for computer systems. More particularly, the invention relates to controlling display lifetime.

BACKGROUND

Displays are key components of substantially every type of computer system. The design of a display plays a significant role in several properties of a computer system, such as size, cost, battery life, power consumption, and overall ease of use. During a computer system design process, typically a display is selected for the computer system to optimize for one or more properties, such as cost, quality of the display which may be measured by resolution, brightness, color and other visual properties, and power consumption.

Recently, new types of displays, such as organic light-emitting diode (OLED) displays, have emerged and offer improved quality of the display as well as potentially lower power consumption. However, some of the new types of displays have a reduced lifetime. In particular, many of these displays suffer from discrepancies in the lifetime of different color components, such as the red, green and blue (RGB) components. Consequently, over the lifetime of the computer system, the ability of the computer system to accurately display certain colors deteriorates, and as a result the lifetime of the computer system may be longer than the lifetime of the display.

SUMMARY OF THE EMBODIMENTS

According to an embodiment, a plurality of display control options is identified. At least one of the display control options is selected to control the display.

According to another embodiment, a lifetime metric for at least a portion of a display is determined using a lifetime model, and at least one display control option for controlling the display is identified using a usage model.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF THE EMBODIMENTS

For simplicity and illustrative purposes, the principles of the embodiments are described. Moreover, in the following detailed description, references are made to the accompanying figures, which illustrate specific embodiments. Electrical, mechanical, logical and structural changes may be made to the embodiments without departing from the spirit and scope of the embodiments.

According to an embodiment, a lifetime-aware control system is used to control the lifetime of a display used with a computer system. For example, a lifetime model and a usage model are generated for a display. The lifetime model includes an approximation of the expected lifetime of a display or a portion of a display and is used to predict the remaining life of a display or a portion of the display, such as the remaining life of a sub-pixel, a pixel, or group of pixels in the display. A pixel may be composed of three sub-pixels, one red, one green, and one blue (RGB). Taken together this sub-pixel triplet comprises a single pixel.

The usage model is an approximation of the estimated use of the display. Using the lifetime model, a determination is made as to whether to control the display to optimize lifetime. Using the usage model and possibly the lifetime model, a set of display control options associated with different alternatives for controlling the display are determined if the lifetime of the display is to be optimized. A display control option may include one or more parameters, such as color, intensity, brightness, location on a display, etc., of an image displayed by a portion of the display. One or more of the parameters may be varied to each of the display control options in the set of display control options. Examples of the display control options may include controlling the color for pixels or sub-pixels, controlling the intensity (i.e., brightness) of pixels or sub-pixels, dimming, dithering, moving an image to a different location on the screen, etc. One or more of the display control options are selected and implemented to optimize the display lifetime. For example, if a portion of a display is determined to have excessive wear, such as determined using the lifetime model, then a display control option may be implemented to increase the remaining life of that portion of the display. As a result, a display control option may be implemented to equalize the wear of pixels or sub-pixels, which may result in an overall increase in the lifetime of the display.

Figure 1:
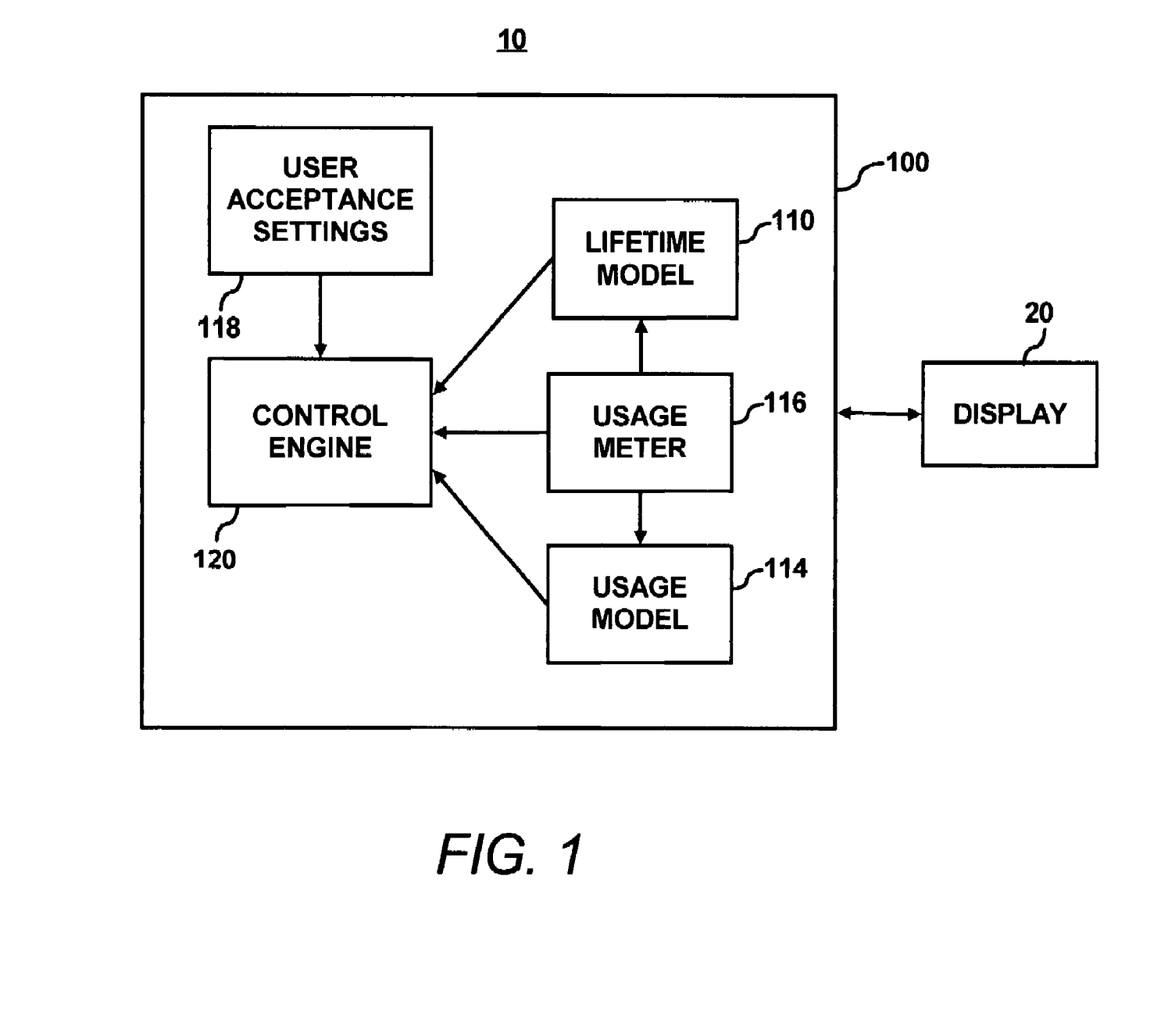
FIG. 1 illustrates a block diagram of a lifetime-aware control system, according to an embodiment.

FIG. 1 illustrates an embodiment of a lifetime-aware control system 100 implemented in a computer system 10. The computer system 10 may include almost any type of device, such as personal computers, laptops, personal digital assistants, telephones, cellular phones, cameras, printers, televisions, etc. The computer system 10 includes a display 20. The display 20 may be integrated with the computer system 10 or provided as a separate unit. The display 20 is broadly defined to include any combination of software and hardware associated with the visual representation of data. For example, the display 20 may include a display panel, display controller, and drivers. Various types of display technologies may be used, such as cathode ray tube, liquid crystal display, digital light projection, plasma, organic light emitting diodes (OLEDs), etc. In one example, the display hardware supports control of portions of the display. For example, the hardware may include OLEDs, tiled displays, or multiple displays in the computer system 10. OLEDs allow pixels or sub-pixels to be individually controlled, while tiled displays allow control over groups of pixels. The lifetime-aware control system 100 may control portions of the display 20 to maximize lifetime of the pixels. With OLEDs, this may include individual control of sub-pixels, pixels or a group of pixels, such as controlling power consumption, intensity, color, refresh rate, etc. of a portion of the display 20. If multiple displays are provided in the display 20, then the lifetime of one of the displays may be optimized by shifting a screen or a portion of a screen to another display. A screen is the visual representation provided by the display, such as the visible image.

The lifetime-aware control system 100 includes a lifetime model 110, a usage model 114, a usage meter 116, user acceptance settings 118 and a control engine 120. The lifetime-aware control system 100 may be implemented in hardware, software or a combination thereof as would readily be implemented by one of ordinary skill in the art. For example, the control engine 120 and/or other components of the lifetime-aware control system 100 may be implemented in software at the operating system level or windowing environment level that controls the display 20. Alternate embodiments implement the lifetime-aware control system 100 in hardware or at the firmware or application layers.

The lifetime model 110 can be used to determine a lifetime metric for the display 20. The lifetime metric may include any measured, calculated or estimated value associated with the lifetime of the display 20. The lifetime metric may include an estimate of past use and a prediction of future use of the display 20. The lifetime metric may also be associated with the past use and predicted remaining life for groups of pixels, one pixel or sub-pixels (e.g., each red, green, and blue component of each pixel).

Figure 2A:
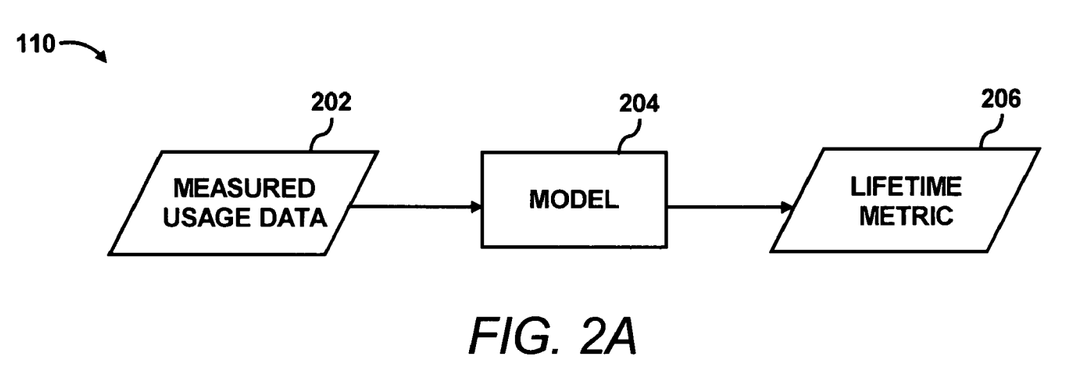
FIGS. 2A-B illustrate block diagrams of embodiments of a lifetime model.

Past use of the display 20 may be determined by measurement. The usage meter 116 may be used to monitor use of the display 20. For example, the usage meter 116 may include sensors for measuring the intensity of each sub-pixel. FIG. 2A illustrates an embodiment of the lifetime model 110 including measured usage data 202. The measured usage data 202 may include a measured parameter associated with the display 20, such as intensity of each sub-pixel, length of use, etc. In one example, current or light output is measured to determine past use of each sub-pixel. Also, an approximation may be used to estimate past use of a group of pixels based on measured parameters for a subset of pixels or sub-pixels.

The measured usage data 202 is input into a mathematical model 204 to determine the past use and estimate the remaining life of pixels or sub-pixels. Thus, the mathematical model 204 can be used to determine a lifetime metric 206, such as an estimate of past use and a prediction of remaining life for pixels in the display 20. The mathematical model 204 may be determined using parameters experimentally derived from testing the lifetime of similar displays. Also, display degradation curves provided by manufacturers may be used to estimate remaining life of a pixel or an entire display. For example, the mathematical model 204 may include degradation curves for sub-pixels. Based on the measured or estimated past use (e.g., number of hours of use), the remaining life of a sub-pixel is determined using the degradation curve.

Figure 2B:
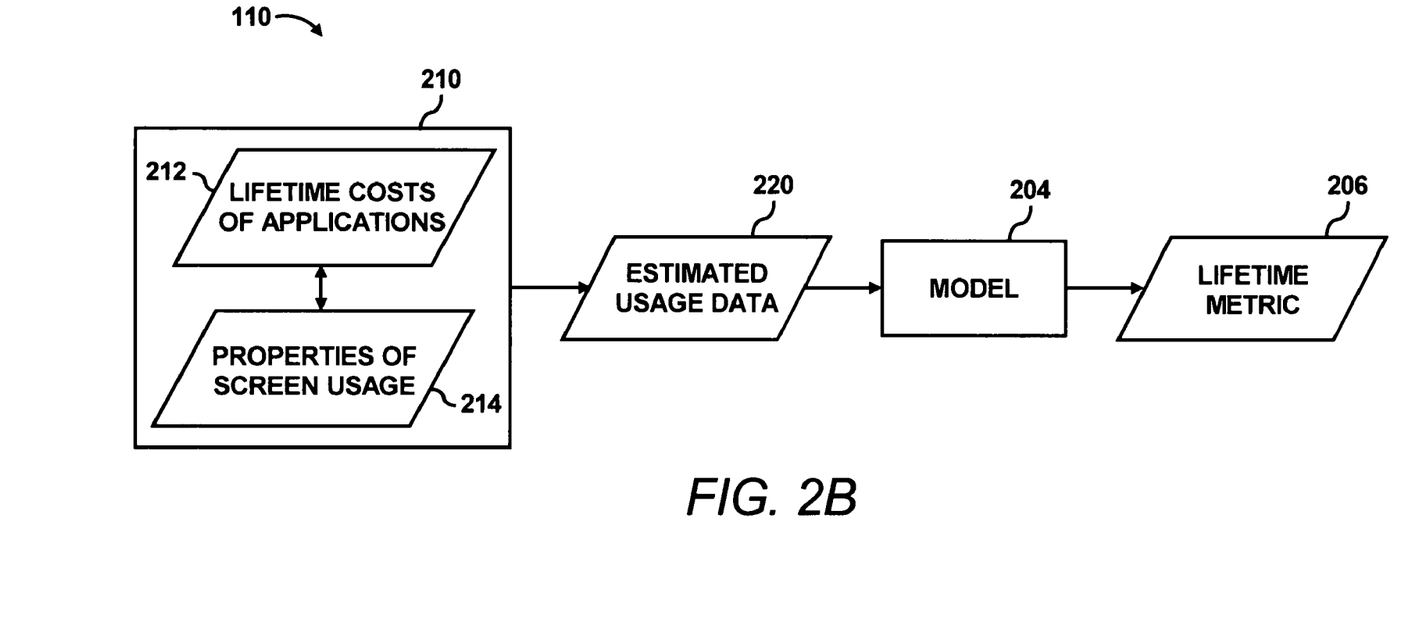

Instead of an actual measurement, a predictive model 210, shown in FIG. 2B, may be used to determine past use and estimate remaining life of the display 20. FIG. 2B illustrates another embodiment of the lifetime model 110 using the predictive model 210 to estimate past use of the pixels in the display 20. The predictive model 210 includes lifetime costs 212 associated with the screen usage of applications that typically run on the computer system 10. The lifetime costs 212 may include screen usage patterns for applications. For example, the predictive model 210 determines that applications that use images with mostly red colors result in lower lifetime for the display 20 than applications that use images with mostly green colors.

The predictive model 210 also includes properties 214 of screen usage. For example, for windows-based environments the properties 214 include information on the average screen area used by a window of focus, the average screen area used by non-minimized windows, and the minimum brightness to which the background can be dimmed and still be acceptable by the user. User acceptance may be experimentally determined using focus groups. Other examples of the properties 214 include areas of the screen that do not make full use of screen functionality for extended periods of time, such as limited use of particular colors, low refresh rates, etc. The lifetime costs 212 and the properties 214 may be derived from screen usage patterns determined by the usage model 114.

The output of the predictive model 210 includes the estimated usage data 220 for the display 20. The estimated usage data may include estimated past use of the display 20 or portions of the display 20 based on the lifetime costs 210 of the applications run on the computer system 10 and based on the predicted use of the display 20 determined by the properties 214. Using the mathematical model 204, the lifetime metric 206 is determined, which may include past use and estimated remaining life for portions of the display 20.

In one embodiment, estimates of past use, measured values associated with past use, and estimates of remaining life for pixels may be stored in hardware or software registers for each pixel of the display. Periodically, or as required by the lifetime model 110, these values may be updated. In another embodiment, an approximation of pixel use is determined for regions of the display 20 larger than a single pixel, such as a group of pixels. Thus, fewer computations for determining past use and remaining life of pixels are needed, and less memory is needed to store lifetime metrics.

Another component of the lifetime-aware control system 100 shown in FIG. 1 includes the usage model 114. The usage model 114 may include an estimation of the usage of the display 20 and can be used to determine a usage metric for the display 20. The usage metric may include any measured, calculated or estimated value associated with the use of the display 20, such as the amount of use of the display 20, estimated future use of the display 20, display control options associated with different alternatives for controlling the display 20 to maximize lifetime, user acceptance of the display control options, etc.

Figure 3:
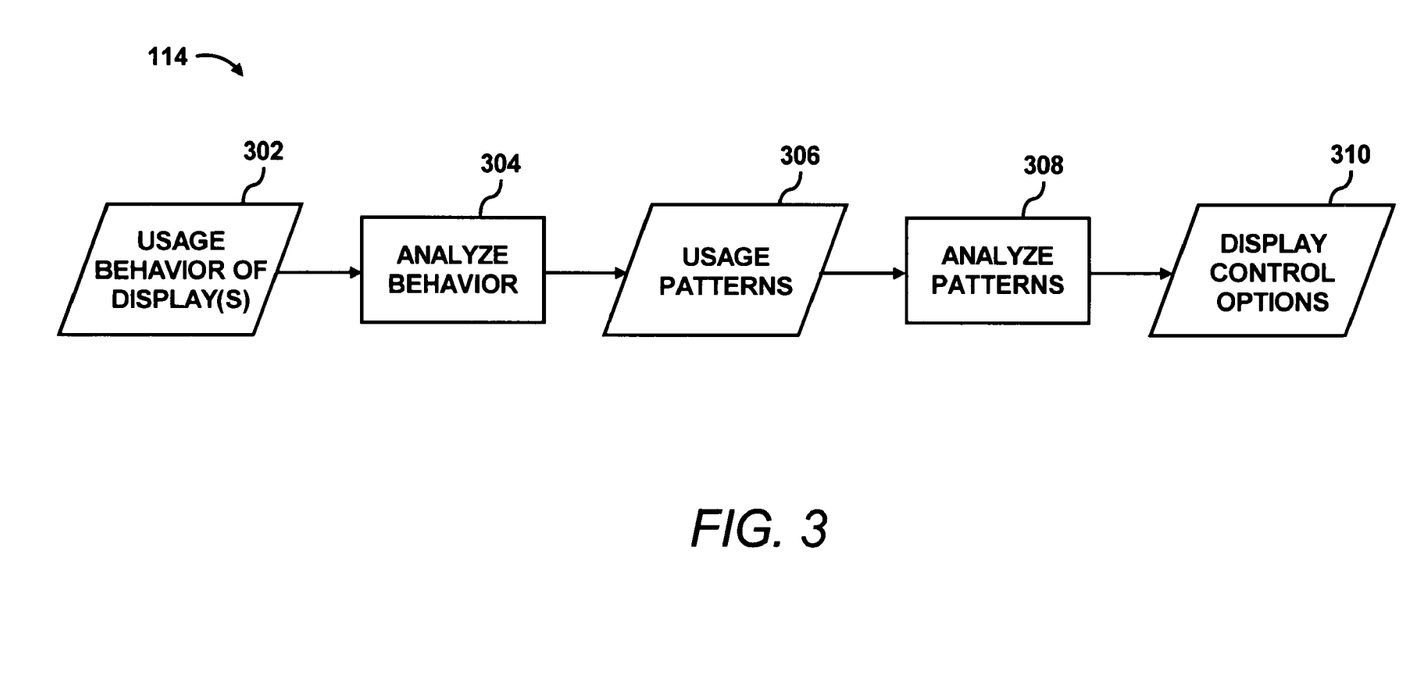
FIG. 3 illustrates a block diagram of a usage model, according to an embodiment.

A block diagram of the usage model 114 is shown in FIG. 3. The usage model 114 may include the results of profiling the use of the display 20 or one or more similar displays. For example, as shown in FIG. 3, the usage model 114 captures the typical usage behavior 302 of the display 20 or one or more similar displays. Profiling usage of the display, which may include capturing usage behavior and determining usage patterns and display control options, can be performed online or off line. A historical analysis of the display usage may include an analysis of the display 20 captured offline, such as during a study of the use of the display 20 or similar displays, and/or online, such as capturing the use of the display 20 by a particular user of the computer system 10. Online and offline analysis may include an analysis of usage patterns of a display over a period of time for a plurality of users.

The historical analysis of the use of the display 20 or one or more similar displays can be performed to capture the usage behavior 302 and to determine the usage patterns 306 and the display control options 310. U.S. patent application Ser. No. 10/033,738, entitled "Software-Directed Energy-Aware Control Of Display" by Ranganathan et al., which is incorporated by reference in its entirety, discloses conducting a historical analysis of the usage of a display to determine an area of focus. The historical analysis can examine the use of the display 20 or similar display by a particular user, by a class of users, and/or by general use not categorized by class. The captured usage behavior 302 may include monitoring the screen usage of typical applications that are run on a computing system using the display.

The usage behavior is analyzed, as represented by the block 304 in FIG. 3, to identify usage patterns. Analyzing usage behavior may be performed by an administrator to identify the usage patterns 306. Also, known algorithms and statistical analysis techniques may be used to analyze the usage behavior 302. Examples of the usage patterns 306 for windows-based environments include the average screen area used by the window of focus, the average screen area used by other windows, and the minimum level of brightness to which the background can be dimmed or otherwise modified without compromising the user experience, such as measured by a target focus group of test subjects. Additional examples may include identifying a histogram of colors used by a typical user and identifying areas of the screen that do not require full use of the display functionality, e.g., color, higher refresh rate, etc., for long periods of time.

The usage patterns 306 are analyzed, as represented by block 308 shown in FIG. 3, and the content and intent of the use of the display 20 are determined based on the usage patterns 306. For example, the area of focus for the display 20 is determined for a screen including a word processor. When the word processor is running, anything outside of the window of focus may be optimized, such as dimmed, color changed, etc., to optimize for lifetime. Thus, based on an analysis 308 of the usage patterns 306, display control options 310 are determined. The analysis 308 may be performed by an administrator to identify the content and intent of the users and the display control options 310. Also, known algorithms and statistical analysis techniques may be used to analyze the usage patterns 306.

The display control options 310 are different options for controlling the display 20 to optimize the lifetime of the display 20. One or more of the display control options 10 are implemented by the control engine 120 to increase lifetime of the display 20. Examples of the display control options may include controlling the color for pixels, controlling the intensity of pixels, dimming, dithering, moving an image on a screen, etc.

In one embodiment, portions of the display 20 may be controlled by varying parameters of the image being displayed (such as brightness, color, gray-scale, etc.). For example, the analysis 308 of the usage patterns 306 shown in FIG. 3 may conclude that the full functionality of the display 20 in terms of resolution, color, screen area, etc., is not used throughout the entire display 20. Thus, the image displayed on the screen can be modified to even out the wear and improve the lifetime of the display 20 without significantly impacting the user's experience. For example, windows on a screen may be moved to different areas of the display 20 to equalize pixel wear and the remaining life of pixels. The position of small windows or icons, such as time, etc., may be moved by small amounts every time a user logs into the computer system 10. Also, an email notification message can be displayed at different portions of the screen at different times. Alternatively, during the image stabilization phase of a camcorder, the image can be moved imperceptibly to optimize for the lifetime of the pixels.

Other display control options 310 may include varying colors, such as by changing the color of a notification periodically. For example, with an OLED display that has greater lifetime for green sub-pixels than for red sub-pixels, using green sub-pixels more often than red sub-pixels improves the lifetime of the overall display. Also, a dithering algorithm may be used that provides benefits without perceptible changes to the image. For example, when presenting a photograph or other image at a resolution lower than that of the display, the actual color of part of a photograph is displayed by mapping it into a pattern of red, green, and blue sub-pixels of varying intensity. As the perceived color is a function of the overall blended color of the pattern, there is often a choice as to which pixel colors are used to represent the perceived color. This choice can be used to even wear of the sub-pixels. Other display control options 310 may include dimming portions of the screen. A display control option may take into consideration various factors, such as screen usage for a given workload, user preferences, affect on lifetime, and the display technology.

Another component of the lifetime aware control system 100 shown in FIG. 1 is the usage meter 116. The usage meter 116 captures the usage of the display 20 by individual users during periods of time and may also predict how usage patterns are likely to change. For example, the usage meter 116 stores the length of time and a window shown on the display 20 is being used. The size of the window may also be stored, which can be used to determine a user's area of focus on the display 20. The output of the usage meter 116 may be provided to the usage model 114 and the control engine 120. Referring to FIG. 3, the usage behavior 302 may include display usage captured by the usage meter 116. The lifetime model 110 may also utilize information from the usage meter 116, such as for the measured usage data 202 or the properties of screen usage 214 shown in FIGS. 2A-B.

The lifetime-aware control system 100 may also include user acceptance settings 118. These are settings, which are typically determined by a user, for the display 20 that are acceptable to the user. For example, the control engine 120 may determine that it is beneficial for lifetime to move a window displaying the time to an upper left corner of the screen. However, if the user acceptance settings indicate that the time window must be placed in the lower right corner of the screen, the control engine 120 does not move the time window. Instead, the control engine 120 may select another display control option to implement. The user acceptance settings 118 may also include an option for the user to turn off the lifetime-aware control.

The control engine 120 determines whether to implement lifetime-aware control of the display 20 using at least the lifetime model 110 and, if needed, selects one or more display control options to implement using at least the usage model 114. The control engine 120 uses one or more lifetime metrics, such as the lifetime metric 206 shown in FIGS. 2A-B, for determining whether to implement lifetime-aware control of the display 20. For example, the control engine 120 determines the past use of a sub-pixel, and the predicted future use of the sub-pixel, which may be based on the current use of the sub-pixel as determined by the usage meter 116 and/or the usage model 114. If the predicted future use exceeds a threshold, then the control engine 120 selects a display control option to implement, such as one of the display control options 310 shown in FIG. 3. The threshold may be based on a predetermined length of use or a predetermined intensity. Also, the control engine 120 may approximate a lifetime metric for a group of pixels from measurements or estimations determined for a subset of the group of pixels and compare the lifetime metric to the threshold.

After a portion of the display is identified, for example, based on the results of a comparison of a lifetime metric to the threshold, the control engine 120 selects one or more display control options to implement for increasing the life of the portion of the display. The control engine 120 may identify possible display control options from the usage model 114.

Also, the control engine 120 may utilize the lifetime model 110 and the user acceptance settings 118 to determine whether a particular display control option is feasible. For example, if the display control option includes moving a time window to an upper left corner of the screen, the control engine 120 invokes the lifetime model 110 to determine whether the pixels in that portion of the screen are being overly used. If those pixels, for example, have a past use or predicted future use exceeding or close to a threshold, then the time window may be moved to another portion of the screen. The user acceptance settings 118 may also place constraints on the location of the time window.

The process of determining whether to implement lifetime-aware control of the display 20 may be performed periodically or in response to predetermined events. For example, the determination may be performed when a new image is displayed on the screen of the display 20 and/or after the display has been used for a predetermined period of time.

Figure 4A:
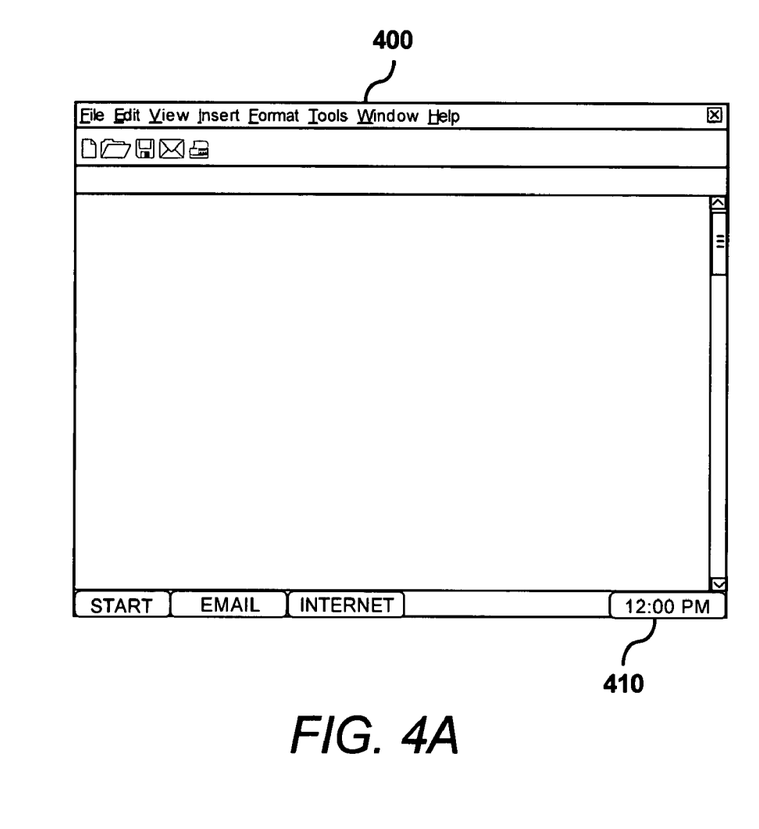
FIGS. 4A-B illustrate an example of implementing a display control option.
Figure 4B:
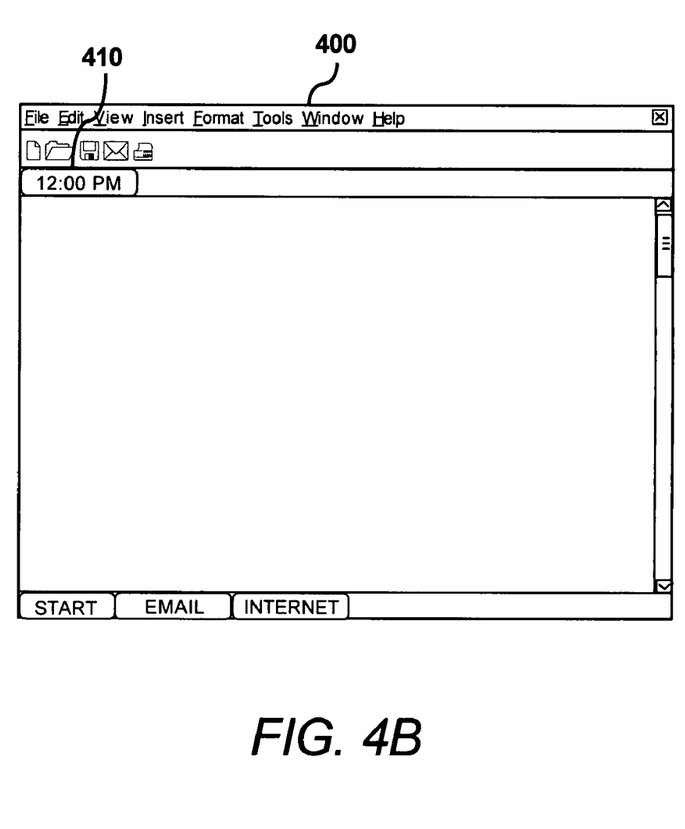

FIGS. 4A-B illustrate examples of providing lifetime-aware control of the display 20. FIG. 4A shows an example of a screen 400 on the display 20. The screen 400 includes a maximized window for a word processing application. Typically text (not shown) for an opened document is displayed in the screen 400. The screen 400 includes a time window 410 shown in the lower right corner of the screen 400. The control engine 120 determines that one or more pixels displaying the time window 410 need to be controlled to optimize for lifetime using the lifetime model 110 shown in FIG. 1. The control engine 120 selects a display control option to implement, which includes moving the time window 410 to the upper left corner of the screen 400, such as shown in FIG. 4B. FIGS. 4A-B illustrate one example of implementing a display control option. Other options may include changing the color of the time window 410, periodically moving the time window 410, dimming the time window, etc.

Figure 5:
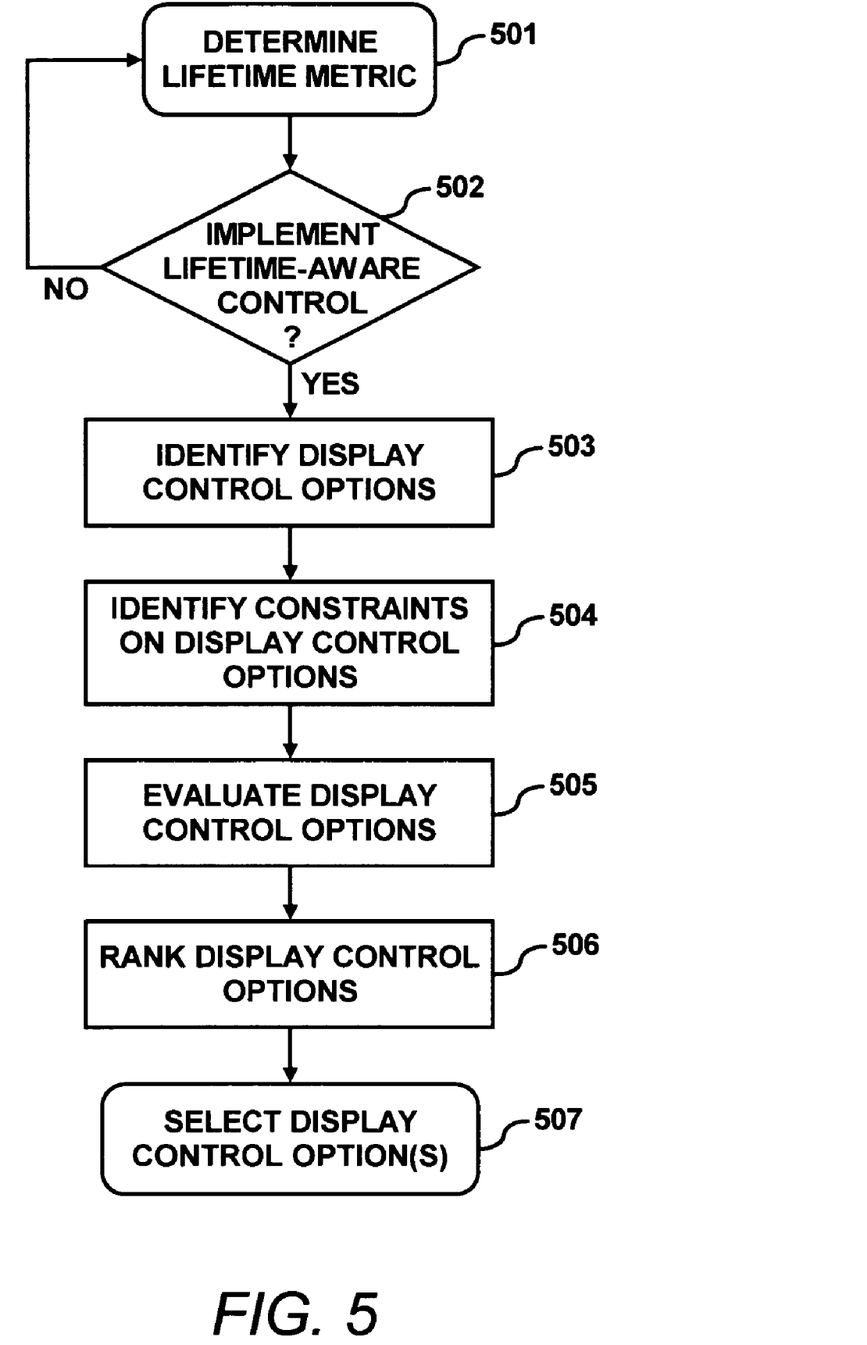
FIG. 5 illustrates a flow chart of a method for providing lifetime-aware control of a display, according to an embodiment.

FIG. 5 illustrates a flow chart of a method 500 for providing lifetime-aware control of the display 20, according to an embodiment. FIG. 5 is described with respect to the lifetime-aware control system 100 shown in FIG. 1 by way of example and not limitation. At step 501, the control engine 120 determines a lifetime metric for the display 20. For example, the lifetime model 110 determines past use and predicted future use for a portion of the display 20, which may include a sub-pixel, pixel, or group of pixels, and outputs the lifetime metric to the control engine 120.

At step 502, the control engine 120 determines whether to implement lifetime-aware control of the display 20. For example, if the past use or predicted future use of a portion of the display exceeds a threshold, the control engine 120 implements a display control option to control the life of the pixels or sub-pixels having a lifetime metric (e.g., past use, predicted future use, etc.) determined to exceed the threshold.

At step 503, the control engine 120 identifies one or more display control options that may be implemented to increase the remaining life of the portion of the display identified at step 502. For example, the usage model 114 identifies several display control options based on usage patterns for the display 20 or similar displays. Referring to FIGS. 4A-B, for example, if the pixels displaying the time window 410 have lifetime metrics that exceed the threshold, the control engine 120 determines from the usage model 114 that display control options comprising moving the time window 410, changing the color of the time window 410, and/or dimming the time window 410 may be implemented.

At step 504, the control engine 410 determines whether the user acceptance settings 118 place constraints on the display control options identified at step 503. For example, the user acceptance settings 118 may require that the time window 410 be located in the position shown in FIG. 4A. Then, the display control option of moving the time window 410 is not implemented.

At step 505, the control engine 120 uses the lifetime model 110 to evaluate the display control options selected at steps 503 and 504. This may include the control engine 120 determining the lifetime implications of implementing a display control option. For example, if the red sub-pixels displaying the time window 410 have lifetime metrics that exceed the threshold, as determined at step 503, a display control option may include using more of the green sub-pixels for those pixels (e.g., changing the color of the display window 410). The control engine 120 uses the lifetime model 110 to determine whether the green sub-pixels have associated lifetime metrics that exceed or nearly exceed the threshold. This may include modeling the use of the time window 410 with increased use of the green sub-pixels to determine whether predicted future use of the green sub-pixels exceeds the threshold.

Also, at step 505, the control engine may evaluate lifetime savings for each of the display control options. For example, one display control option may include moving the time window 410 shown in FIG. 4A to the position shown in FIG. 4B. The control engine 120 determines the reduction of remaining life for the pixels at the new location that would result from moving the window 410. Another display control option may include changing the color of the time window 410 while maintaining the position of the time window 410 shown in FIG. 4A. The control engine 120 determines the reduction of remaining life for the pixels using the new color. The control engine 120 may select the display control option that results in the smallest reduction of remaining life. Non-lifetime implications of implementing the display control options may also be evaluated, such as user preferences for particular options which may have been determined during a study of the display use.

At step 506, the control engine 120 uses an objective function that considers the lifetime-related and non-lifetime-related implications of implementing a display control option, such as described with respect to step 505. The objective function may weight the different metrics, such as lifetime savings, user preferences, etc., to rank the display control options selected at step 503. Then, one or more of the highest ranked, display control options are implemented at step 507.

Figure 6:
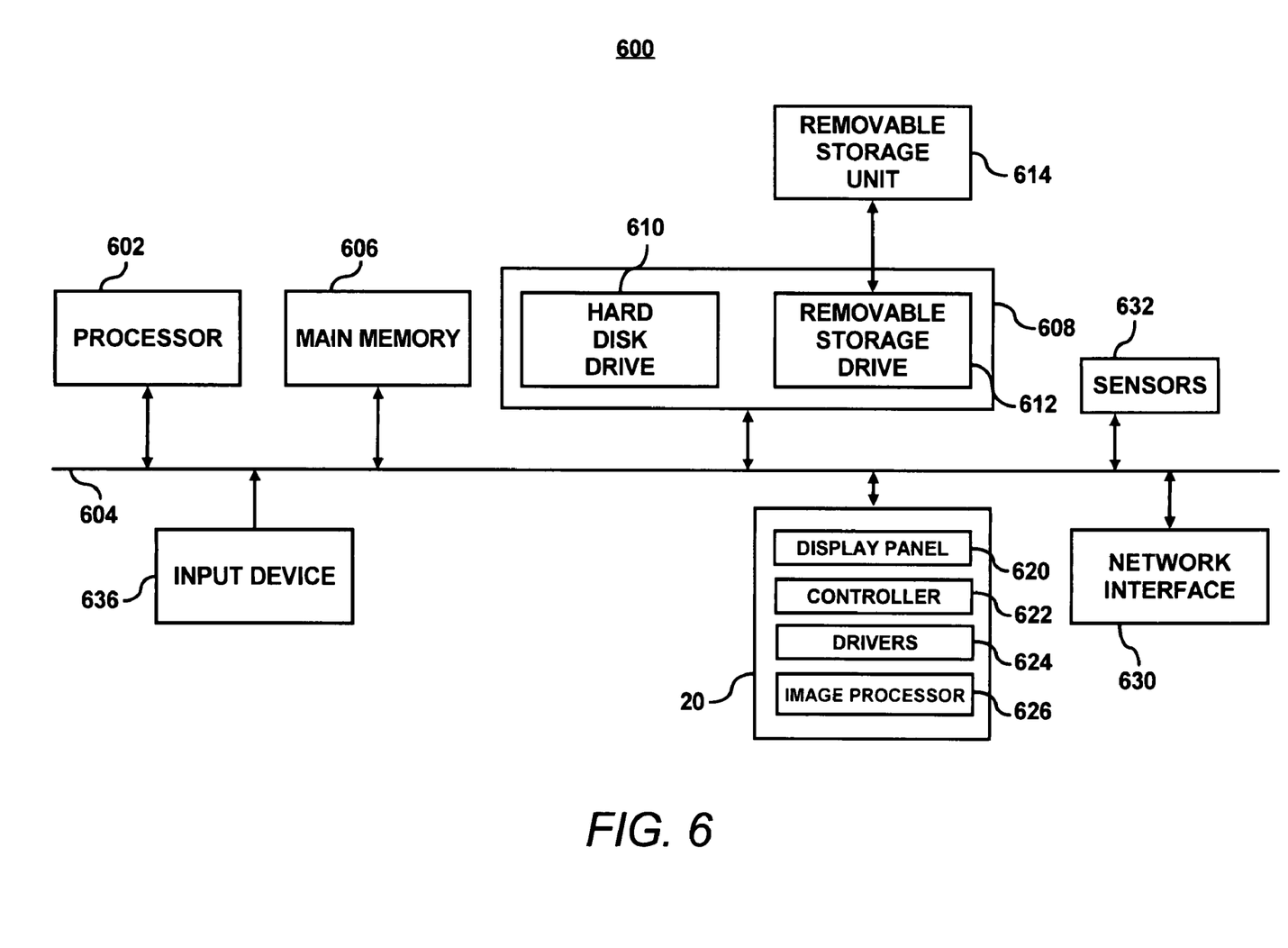
FIG. 6 illustrates a block diagram of a computer system that utilizes the lifetime-aware control system, according to an embodiment.

FIG. 6 illustrates a block diagram of a computer system 10 that includes the display control system 100 shown in FIG. 1. The computer system 10 includes one or more processors, such as processor 602, providing an execution platform for executing software that may embody one or more components of the display control system 100.

Commands and data from the processor 602 are communicated over a communication bus 605. The computer system 10 also includes a main memory 606, such as a random access memory (RAM), where software may be executed during runtime, and a secondary memory 608. The secondary memory 608 includes, for example, a hard disk drive 610 and/or a removable storage drive 612, representing a SIM or memory card, a floppy diskette drive, a magnetic tape drive, a compact disk drive, etc., or a nonvolatile memory where a copy of the software may be stored. The secondary memory 608 may also include ROM (read only memory), EPROM (erasable, programmable ROM), and/or an EEPROM (electrically erasable, programmable ROM). The removable storage drive 612 reads from and/or writes to a removable storage unit 615 in a well-known manner.

A user interfaces with the computer system 100 with one or more I/O devices 636, such as a keyboard, a mouse, a stylus, speech or hand-writing recognition interfaces, etc. The display 20 may include a display subsystem including any combination of the hardware and software modules associated with the visual representation of data for the computer system 600. For example, the display 20 may include a display controller 622, a display panel 620, display drivers 624 corresponding to the display panel technology and an image processing module 626. The image processing module 626 may provide geometry and raster processing. The display 20 may be controlled, in part, by controlling its parameters, such as parameters specified by a display control option, using the display controller 622. Depending on the display features, the display parameters can include intensity, color, refresh rate, gray-scale, ambient illumination, contrast, array size, location of an image on the display 20, number of tiles and the like, or any combination thereof, and may be related to the display control options. The lifetime-aware control system 100, shown in FIG. 1, may provide the necessary instructions to allow the processor 602 to control the display parameters. For example, the processor 602 may instruct the display controller 622 to control the display parameters identified from a selected display control option. Also, the lifetime-aware control system 100, shown in FIG. 1, could be implemented at any layer of a system, including the operating system 424, windowing environment (if applicable) 426, applications 428 or firmware (not specifically shown), and may communicate with an application to control movement of an image if needed to implement a display control option.

A network interface 630 is provided for communicating with other computer systems via a network (not shown). Also, sensors 632 are provided for measuring usage data, such as measured usage data 202 shown in FIG. 2 and the usage behavior 302 shown in FIG. 3. The sensors 632 may be embodied in software, hardware or a combination thereof.

One or more of the steps of the method 500 may be implemented as software embedded on a computer readable medium, such as the memory 606 and/or 608, and executed on the computer system 100. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of optimizing lifetime of a display, the method comprising:
   determining whether to control at least a portion of a display based on a lifetime metric;
   identifying a plurality of display control options by using a usage model in response to determining to control the at least a portion of the display; and
   selecting at least one of the display control options to control the display;
   wherein determining whether to control the display based on a lifetime metric comprises:
   a) comparing the lifetime metric to a threshold; and
   b) determining to perform the step of identifying a plurality of display control options in response to the lifetime metric exceeding the threshold.

2. The method of claim 1, further comprising:
   implementing the selected display control option to increase a remaining life of the at least a portion of the display.

3. The method of claim 1, wherein selecting at least one of the display control options comprises:
   selecting at least one of the display control options using at least one of the usage model and a lifetime model.

4. The method of claim 1, wherein selecting at least one of the plurality of display control options comprises:
   evaluating the plurality of display control options; and
   selecting the at least one of the plurality of display options based on the evaluation.

5. The method of claim 4, wherein evaluating the plurality of display control options comprises:
   identifying a constraint on implementing any one of the plurality of display control options.

6. The method of claim 5, wherein the constraint comprises a user acceptance setting.

7. The method of claim 4, wherein evaluating the plurality of display control options comprises:
   determining a lifetime savings for each of the plurality of the display control options.

8. The method of claim 4, wherein evaluating the plurality of display control options comprises:
   evaluating lifetime metrics and non-lifetime metrics for each of the plurality of display control options; and
   ranking the plurality of display control options based on the evaluation.

9. The method of claim 8, wherein evaluating lifetime metrics and non-lifetime metrics for each of the plurality of display control options comprises:
   using at least one of a lifetime model and a usage model to evaluate lifetime metrics and non-lifetime metrics for each of the plurality of display control options.

10. The method of claim 1, wherein determining a lifetime metric for at least a portion of the display comprises:
    determining at least one of past use and predicted future use of the at least a portion of the display.

11. The method of claim 1, wherein determining a lifetime metric for at least a portion of the display comprises:
    using a lifetime model to determine the lifetime metric, wherein the lifetime model includes an estimation of the lifetime of the at least a portion of the display.

12. The method of claim 11, wherein the lifetime model comprises a display degradation curve or another similar estimation of remaining lifetime of the display based on past use of the display.

13. The method of claim 11, wherein using a lifetime model to determine the lifetime metric comprises:
measuring use of the at least a portion of the display; and
applying the measured use to the lifetime model to determine the lifetime metric.

14. The method of claim 11, wherein using a lifetime model to determine the lifetime metric comprises:
estimating the lifetime costs of applications typically executed on a computer system including the display;
determining properties of screen usage for the display, the display displaying information from the applications;
estimating the use of the at least a portion of the display based on the estimated lifetime costs and determined properties; and
applying the estimated use to the lifetime model to determine the lifetime metric.

15. The method of claim 1, wherein identifying a plurality of display control options comprises:
analyzing usage of at least one of the display and one or more displays similar to the display;
determining usage patterns from analyzing the usage; and
analyzing the usage patterns to determine the plurality of display control options.

16. The method of claim 1, wherein the at least a portion of the display comprises at least one of a sub-pixel, a pixel, and a group of pixels in the display.

17. The method of claim 1, wherein the plurality of display control options comprise parameters for displaying information on the at least a portion of the display.

18. A method comprising:
determining a lifetime metric for at least a portion of a display being used using a lifetime model;
determining whether to control the at least a portion of the display based on the lifetime metric;
identifying at least one display control option using a usage model in response to determining to control the at least a portion of the display; and
profiling use of at least one of the display and one or more displays similar to the display to establish the usage model, wherein profiling comprises profiling use by a current user of the display.

19. The method of claim 18, further comprising:
implementing the at least one display control option to increase the remaining life of the at least a portion of the display.

20. The method of claim 18, wherein the lifetime model includes an estimation of the lifetime of the at least a portion of the display.

21. The method of claim 18, wherein profiling comprises:
analyzing past use of at least one of the display and the one or more similar displays by a plurality of users.

22. An apparatus comprising:
means for displaying information, the means for displaying is being used to display information;
means for determining a lifetime metric associated with at least a portion of the means for displaying;
means for determining whether to control the at least a portion of the means for displaying based on the lifetime metric;
means for identifying a plurality of display control options operable to increase a remaining life of at least a portion of the display in response to determining to control the at least a portion of the means for displaying;
usage model means for estimating usage of the means for displaying;
means for evaluating the plurality of display control options using the usage model means; and
means for selecting at least one of the plurality of display control options based on the evaluation.

23. The apparatus of claim 22, further comprising:
lifetime model means for estimating a life of the means for displaying.

24. The apparatus of claim 22, further comprising:
means for implementing a selected one of the plurality of display control options.

25. Computer software embedded on a tangible computer readable storage device, the computer software comprising instructions of:
determining whether to control at least a portion of a display being used based on a lifetime metric, wherein determining whether to control at least a portion of a display includes determining to control the at least a portion of the display in response to a lifetime metric exceeding a threshold;
identifying a plurality of display control options in response to determining to control the at least a portion of the display; and
selecting at least one of the plurality of display control options to control the display, wherein the selection includes identifying a user acceptance setting on implementing any one of the plurality of display control options.

26. The computer software of claim 25, further comprising instructions of:
implementing the selected display control option to increase a remaining life of the at least a portion of the display.

27. The computer software of claim 25, wherein the instructions of identifying a plurality of display control options comprise instructions of:
identifying a plurality of display control options using a usage model.

28. The computer software of claim 27, wherein the instructions of selecting at least one of the display control options comprise instructions of:
selecting at least one of the display control options using at least one of the usage model and a lifetime model.

29. A computer system comprising:
a display in use and operable to display a visual representation of information on the display;
a processor operable to determine a plurality of display control options for increasing the remaining life of the display, each control option including parameters varying the visual representation of information on the display, wherein the processor is further operable to:
determine to control the display in response to a lifetime metric exceeding a threshold;
identify the plurality of display control options in response to the determination to control the display; and
select at least one of the plurality of display control options to control the display, wherein the selection includes identifying a user acceptance setting on implementing any one of the plurality of display control options; and
a display controller operable to receive parameters for the selected at least one of the control options to control the visual representation of information on the display.

* * * * *

UNITED STATES PATENT AND TRADEMARK OFFICE
CERTIFICATE OF CORRECTION

PATENT NO. : 7,595,796 B2
APPLICATION NO. : 10/830216
DATED : September 29, 2009
INVENTOR(S) : Parthasarathy Ranganathan et al.

It is certified that error appears in the above-identified patent and that said Letters Patent is hereby corrected as shown below:

In column 10, line 47, in Claim 8, delete "claim4," and insert -- claim 4, --, therefor.

Signed and Sealed this

Twenty-eighth Day of September, 2010

David J. Kappos
*Director of the United States Patent and Trademark Office*